Nov. 18, 1941.　　　　G. F. PIEPER　　　　2,263,275
ROTARY INTERNAL-COMBUSTION ENGINE
Filed Feb. 26, 1941　　　4 Sheets-Sheet 1

Inventor
G. F. Pieper
By
Attorneys

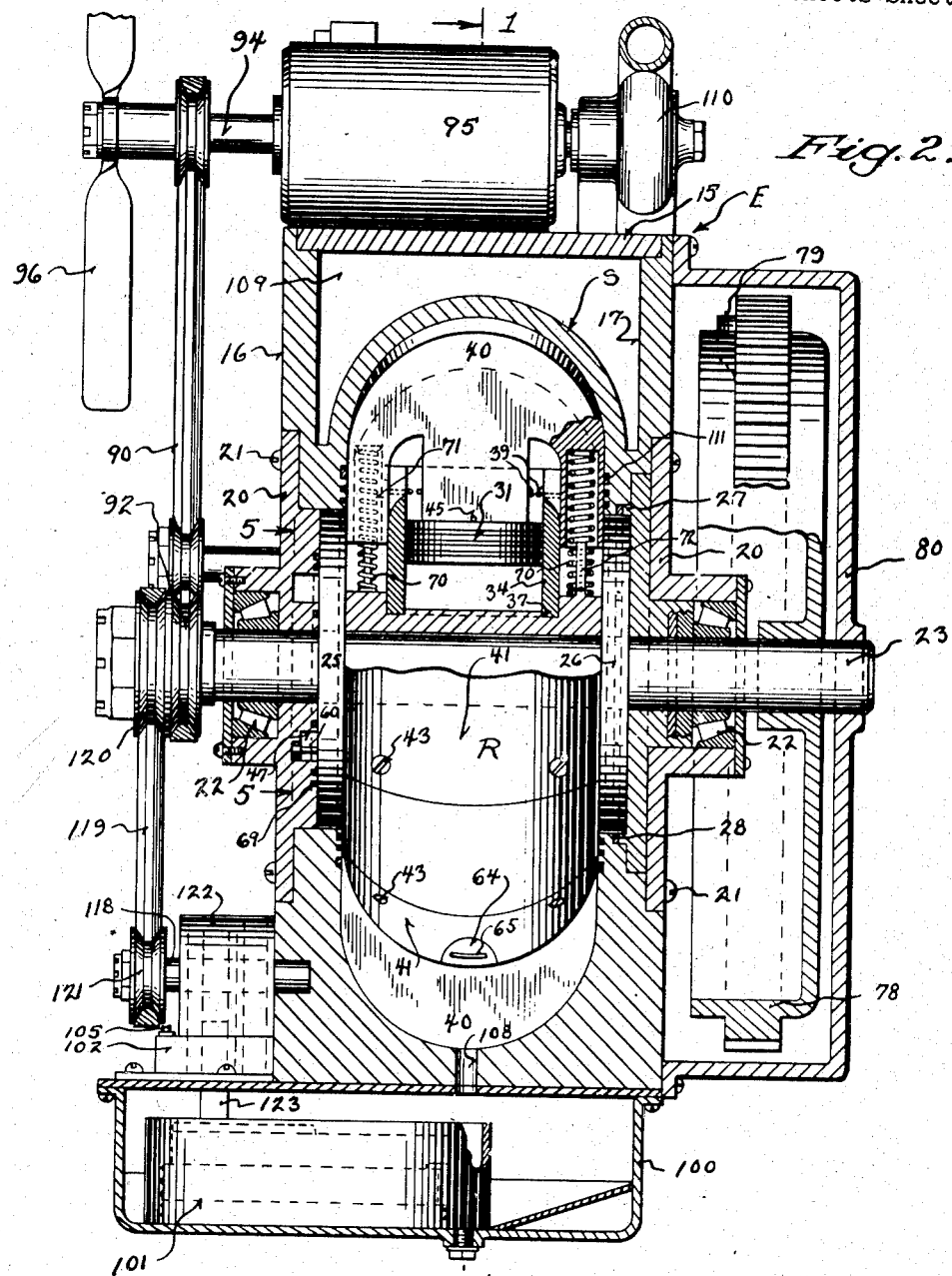

Nov. 18, 1941.  G. F. PIEPER  2,263,275
ROTARY INTERNAL-COMBUSTION ENGINE
Filed Feb. 26, 1941 — 4 Sheets-Sheet 3
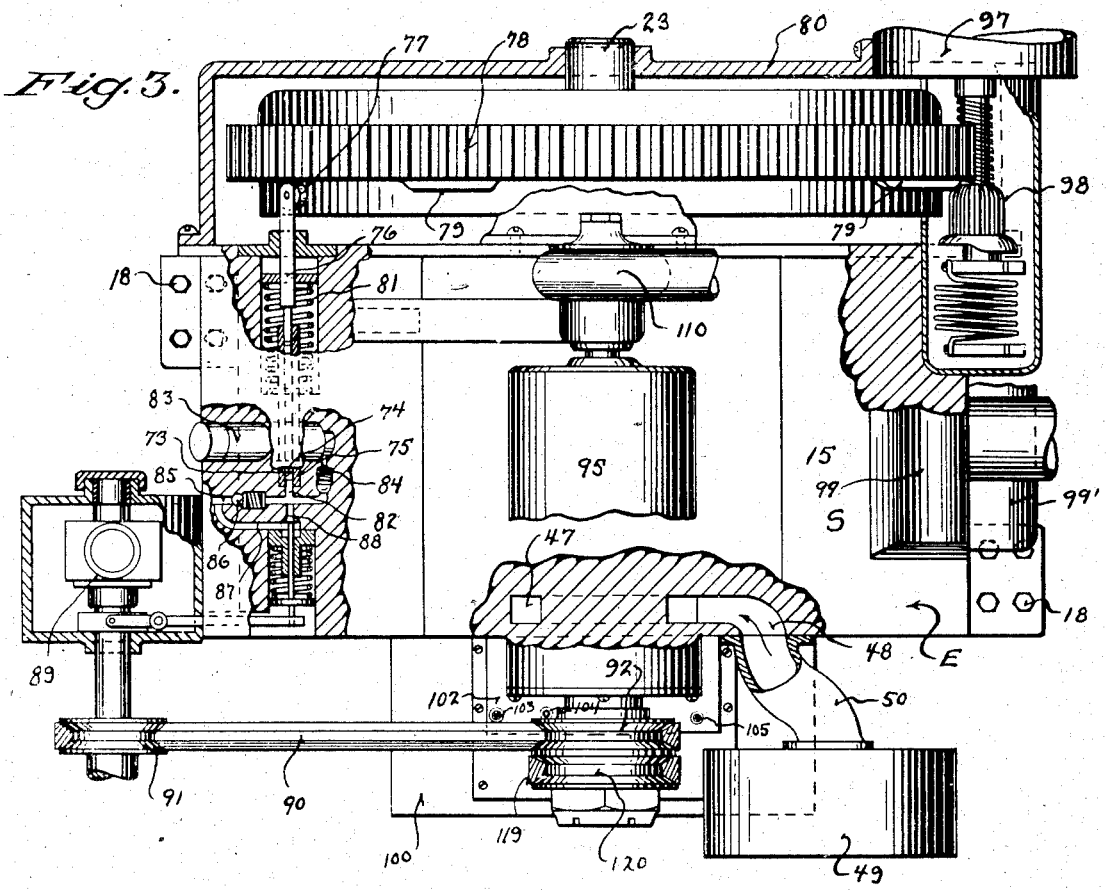
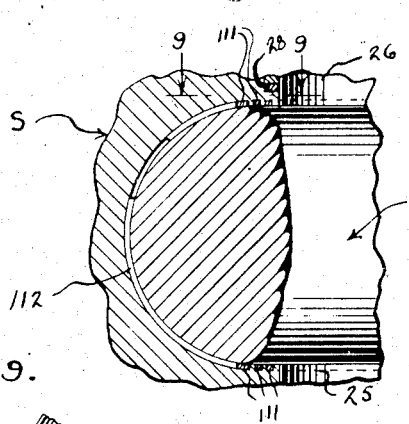
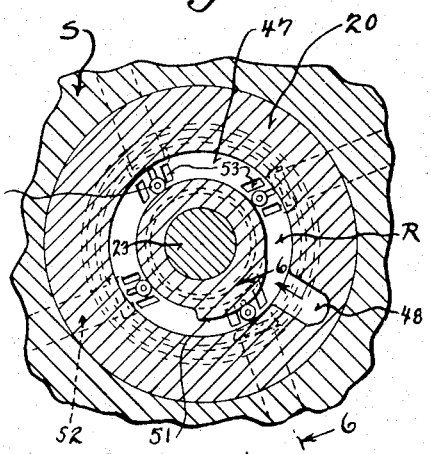
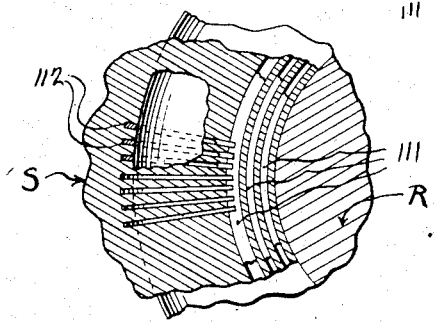
Inventor
G. F. Pieper
By
Attorneys Nov. 18, 1941.   G. F. PIEPER   2,263,275
ROTARY INTERNAL-COMBUSTION ENGINE
Filed Feb. 26, 1941   4 Sheets—Sheet 4
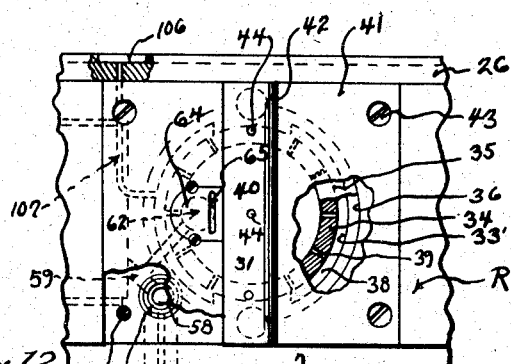
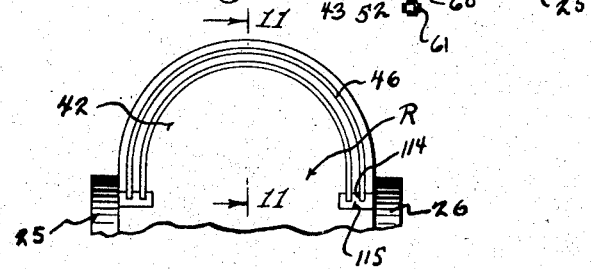
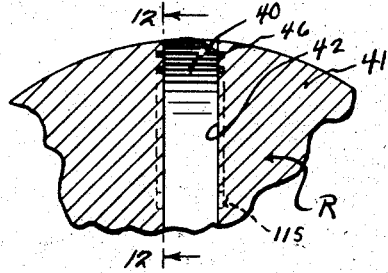
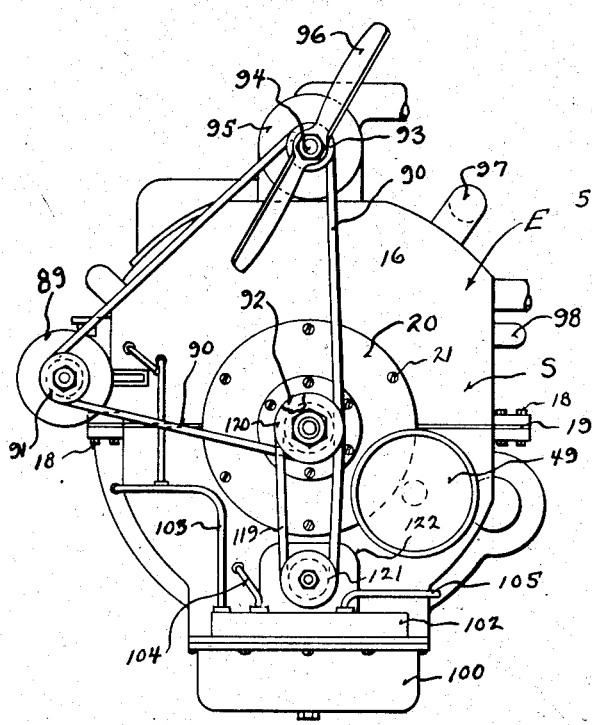
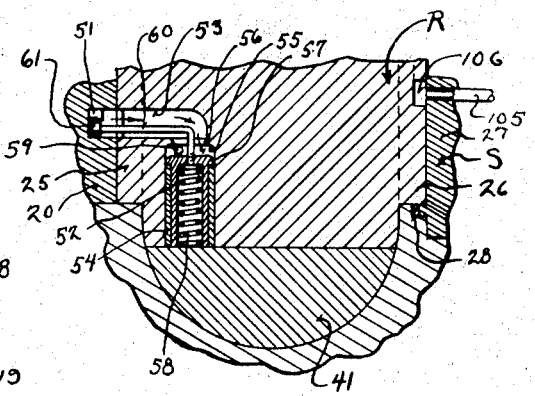
Inventor
G. F. Pieper
By
Attorneys Patented Nov. 18, 1941

2,263,275

UNITED STATES PATENT OFFICE 2,263,275

ROTARY INTERNAL-COMBUSTION ENGINE

George F. Pieper, Milwaukee, Wis.

Application February 26, 1941, Serial No. 380,661

8 Claims. (Cl. 123—16)

This invention appertains to rotary internal combustion engines, and is an improvement on my pending application Serial No. 339,089, filed June 6, 1940.

One of the primary objects of my present invention is to generally simplify the construction of the engine shown in my mentioned application, and to provide means whereby the various parts can be readily assembled or taken apart for repair and replacement.

Another salient object of my invention is to provide novel means for drawing the air charge directly into the cylinders of the rotor, and compressing the same to a high degree therein, and forcing the compressed air at the proper time into the firing chamber to meet the atomized fuel charge.

A further object of my invention is to provide removable wear liners for the cylinders of the rotor and to utilize said liners as means for facilitating the introduction of the lubricating oil to the cylinders and operating pistons.

A further important object of my invention is to provide means for lubricating the walls of the stator from the vanes of the pistons operating in the rotor cylinders.

A still further object of my invention is to provide a removable head for each cylinder of the rotor carrying a control valve for the air under compression to the firing chamber.

A still further object of my invention is to provide means including a primary and a secondary exhaust escape port for insuring the proper scavenging of the engine after the firing of each charge.

A still further important object of my invention is to provide means for building the engine in such a manner whereby the various auxiliary parts, such as the oil and water pumps, starter, generator, and the like, can be conveniently arranged on the motor and operated from the main drive shaft of the motor.

With these and other objects in view, the invention consists in the novel construction, arrangement, and formation of parts, as will be hereinafter more specifically described, claimed, and illustrated in the accompanying drawings, in which drawings:

Figure 2 is a sectional view taken at right angles to Figure 1 and substantially on the line 2—2 of Figure 1, looking in the direction of the arrows.

Figure 3 is a top plan view of the engine, with parts thereof broken away and in section to illustrate structural details.

Figure 4 is a front elevational view of my improved engine.

Figure 5 is a detail, fragmentary, sectional view taken on the line 5—5 of Figure 2, looking in the direction of the arrows and illustrating the inlet channel for the air.

Figure 6 is a detail sectional view through the engine, illustrating the means for actuating the air inlet valves for the cylinders of the rotor.

Figure 7 is a detail, fragmentary, sectional view taken on the line 7—7 of Figure 1, looking in the direction of the arrows, illustrating the arrangement of one of the cylinder heads in the rotor.

Figure 8 is a detail, fragmentary, sectional view through the rotor and stator, taken on the line 8—8 of Figure 1, looking in the direction of the arrows, illustrating the arrangement of the compression rings between the stator and rotor.

Figure 9 is a detail, fragmentary, sectional view taken at right angles to Figure 8 and on the line 9—9 of Figure 8, looking in the direction of the arrows, the view also illustrating the arrangement of the packing rings.

Figure 11 is a fragmentary, detail, sectional view through the rotor, taken on the line 11—11 of Figure 12.

Figure 12 is a sectional view through the rotor, taken on the line 12—12 of Figure 11, looking in the direction of the arrows, showing the compression rings or bands for engaging the sliding vanes.

Figure 14 is a detail, side, elevational view of the main gear utilized in conjunction with the starter for initially turning over the engine with the control cams or lobes thereon for operating the fuel pump.

Referring to the drawings in detail, wherein similar reference characters designate corresponding parts throughout the several views, the letter E generally indicates my improved engine, and the same includes the stator S and the rotor R.

Figure 1:
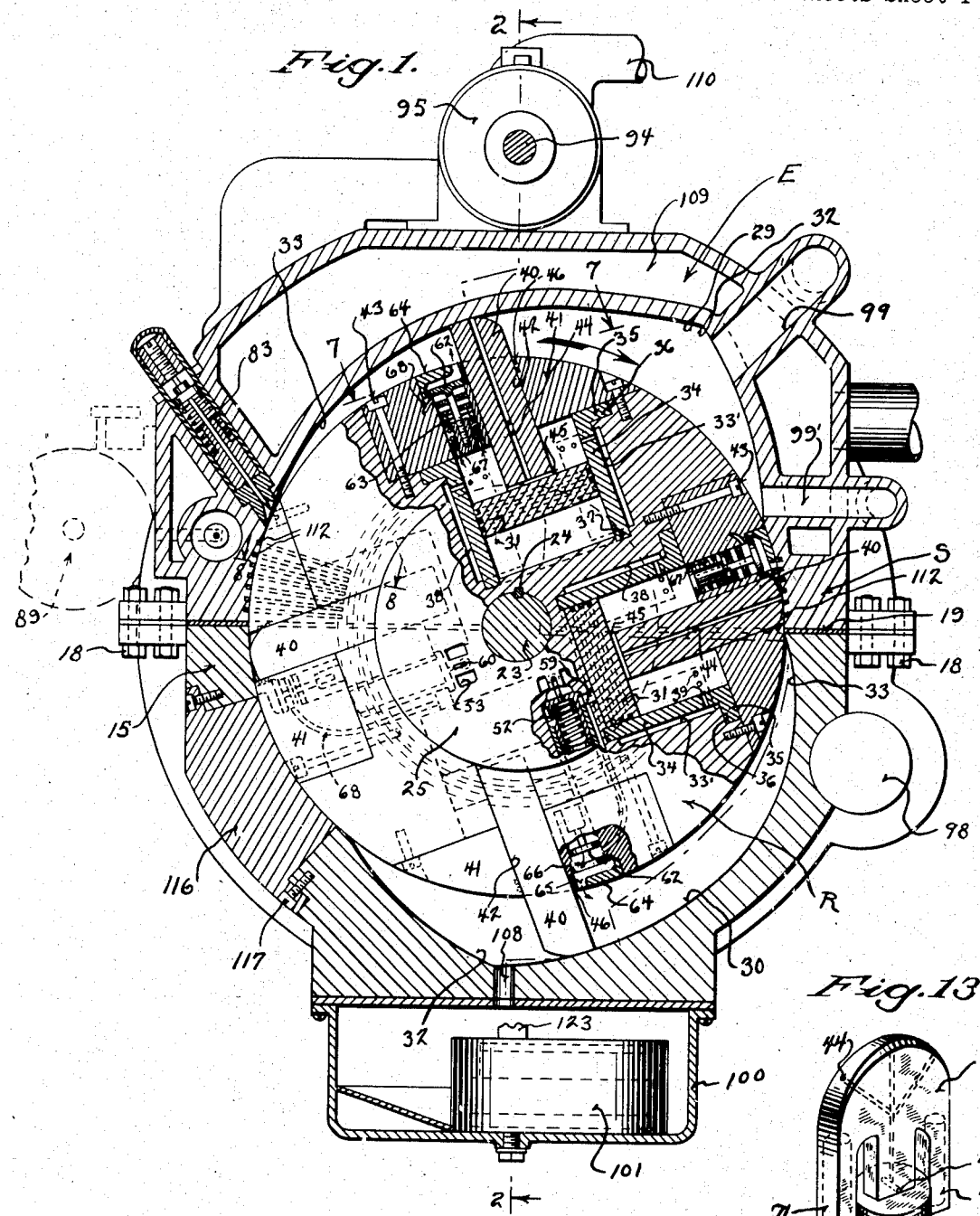
Figure 1 is a sectional view through the engine, taken substantially on the line I—I of Figure 2, looking in the direction of the arrows.
Figure 13:
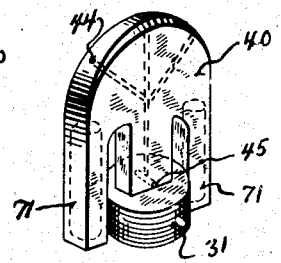
Figure 13 is a detail, perspective view of one of the pistons and its operating vane.
Figure 10:
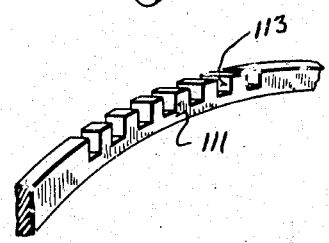
Figure 10 is a detail, fragmentary, perspective view of one of the annular packing or compression rings carried by the stator for engaging the sides of the rotor.

The stator S includes the annular outer wall 15 and the spaced side walls 16 and 17. As clearly shown in the drawings, the stator is preferably formed in companion half-sections to facilitate the assembling of the engine, and these half-sections are firmly secured together by bolts 18. A suitable packing gasket 19 can be interposed between the sections. The side walls 16 and 17 receive therein at ther axial centers bearing discs 20. These bearing discs are firmly united to the side walls by the use of suitable fastening elements, such as machine screws 21. The bearing discs 20 carry any preferred type of anti-friction bearings, such as roller bearings 22 for the main drive or propeller shaft 23, and this shaft carries the rotor R.

The rotor R is secured to the shaft 23 by a key 24, but any other suitable fastening means can be employed. The rotor R is preferably formed from a single block of metal to facilitate the functioning thereof as a flywheel.

The rotor is of a circular shape in side elevation, and the interior of the stator is shaped to conform to the configuration of the rotor. The periphery of the rotor is rounded for snug engagement with the inner wall of the stator, and this helps to overcome compression loss. The opposite sides of the rotor block also have secured thereto bearing discs 25 and 26, and these discs fit against the inner faces of the bearing discs 20 carried by the opposite sides of the stator. The disc 26 has its periphery engaged by an annular rib 27 formed on the adjacent stator bearing disc 20, and a sealing gasket 28 can be placed between the rib 27 and the stator. Sealing means is also provided between the rotor disc 25 and its adjacent stator bearing disc 20, as will be later more fully set forth.

The inner surface of the stator at substantially diametrically spaced points is provided with chambers 29 and 30. The chamber 29 constitutes a firing chamber, while the chamber 30 operates as means for permitting the desired radial movement of the air compression pistons 31 carried by the rotor. Both of the chambers 29 and 30 have relatively deep inner ends 32 and forward shallow ends 33, and the chamber surfaces connecting these ends are of an arcuate form, and these surfaces constitute guide or cam tracks for operating the air compression pistons 31, as will be later described.

Referring back to the rotor R, it will be seen that the periphery of the rotor at quarters is bored inwardly to provide piston cylinder chambers 33'. Removably mounted in each cylinder chamber is a cylindrical cylinder liner 34, and the outer ends of the liners are provided with outwardly extending annular flanges 35, which fit in seats 36 formed in the rotor. The inner ends of the cylinder chambers 33' are provided with annular grooves 37 for receiving the inner ends of the liners. The liners are spaced from the side walls of the cylinder chambers to provide oil chambers 38, for a purpose which will also be more fully set forth. It is to be noted, however, that the liners adjacent their outer ends are provided with a plurality of radially extending ports 39 for communicating with the oil chambers.

The compression pistons 31 are slidably mounted in the liners 34, and each compression piston is provided with an outwardly extending vane or blade 40, which operates in the stator chambers 29 and 30. The cylinder chambers 33' are closed by removable blocks or heads 41, and these heads are transversely slotted to form guideways 42 for the vanes or blades 40. The cylinder head or blocks 41 are removably fastened in place by machine bolts 43. Each vane has formed therein longitudinally extending ways 44, which open out through the outer ends of the vanes, and the inner ends of these ways 44 communicate with a crossway 45, which opens out into the cylinders. These ways 44 and 45 provide means for lubricating the walls of the stator, as will also be more fully described. Packing or compression strips 46 are carried by the cylinder heads for engaging the opposite sides of the vanes at the cylinder heads.

As stated, the pistons 31 are utilized for compressing the air during the rotation of the rotor, whereby the air will be delivered to the firing chamber 29 under high compression. Air from the atmosphere is admitted into the cylinders during rotation of the rotor in the following way. The stator bearing disc 20, which is adjacent the rotor bearing disc 25, is provided with an annular air channel 47, and this channel communicates with the atmosphere through an air inlet port 48. The port 48 can have communication with an air cleaner 49 through the medium of a pipe 50. The inner wall of the air channel 47 has formed thereon at the desired point a cam track or lobe 51 for actuating each air inlet valve 52 carried by the rotor.

An air inlet valve 52 is provided for each cylinder chamber, and these air inlet valves control the flow of air through passageways 53, which open out through one side of the rotor. These passageways 53 communicate at all times with the annular air channel 47 as they ride around the channel, and these passageways open out through the bearing disc extension 25. Each air inlet valve 52 includes a cylindrical guide 54 fitted within its valve cavity 55. The inner end of each valve cavity communicates with the air passageway 53 and has formed thereon a valve seat 56. A valve body 57 is adapted to be normally held on its seat 56 by means of an expansion spring 58. The valve cavities are bored in the rotor, and the cavities are closed by the cylinder heads 41. Each valve cavity communicates with its adjacent cylinder by means of an air port 59. When the valve body is lifted off its seat against the tension of the spring 58, air can enter the cylinders.

The valve bodies are operated in the following manner. Each valve body carries an angle-shaped, valve operating rod 60, and the outer ends of these rods 60 extend through the airways 53 and into the air channel 47. The outer ends of the rods carry anti-friction rollers 61, and when these rollers strike the cam track or lobe 51, the valve rods are operated, and the valve bodies will be pushed outwardly off their seats.

Each cylinder head 41 carries an air outlet valve 62, and these valves are arranged alongside of and in parallel relation to the sliding vanes 40. Each cylinder head has formed therein a cylindrical opening 63, and this opening is closed by a removable closure block 64 having formed therein an air outlet passage 65. This passage 65 opens out through the periphery of the rotor, and each opening inward of the closure block 64 is provided with a valve seat on which normally fits a valve body 66. This valve body is held on its seat by a spring 67. The opposite ends of this spring engage, respectively, an adjustable spring seat carried by the valve stem and a stationary spring seat and guide secured to the wall of the valve opening.

The adjacent air ports 59 and the valve openings 63 are connected by passageways 68 formed in the rotor block, and these passageways communicate with the valve openings 63 just inward of the valve seats. Hence, when a valve body 66 is forced off its seat, air will flow past the valve body through the air port 65 and out of the periphery of the rotor.

To prevent the escape of air between the rotor disc extension 25 and the adjacent stator bearing disc 20, sealing rings 69 can be carried by said adjacent stator bearing disc 20, and these rings are disposed on each side of the air channel 47 and engage the outer face of the bearing disc extension 25 of the rotor.

The air is compressed and forced into the firing chamber 29 in advance of a vane or blade in the following manner: Considering that the rotor is turning in a clockwise direction (see Figure 1) and a vane is entering the chamber 30, then this vane and its piston will be forced outwardly by the expansion springs 70, which will be hereinafter more fully referred to. As this piston moves outwardly, air will be sucked into the inner end of the cylinder through the port 48, annular air channel 47, passageway 53, and port 59, it being understood that at this particular time the roller 61 for the air inlet valve 57 adjacent this vane is riding on the cam track 51, causing the opening of this valve 57. As the vane leaves the chamber 30 and the air inlet valve closes, the vane is forced inwardly, and its piston compresses the air to a high degree and forces the air into the passageway 68. As the vane rides into the shallow end 33 of the firing chamber 29, the air is compressed to such a degree that the air outlet valve 66 is moved off its seat against the tension of its spring, and this compressed air flows into the firing chamber. This cycle is followed by each vane during each complete rotation of the rotor.

Referring back to the expansion spring 70 for the vanes and pistons, it will be noted that each vane has formed on its sides inwardly directed guides 71. These guides are hollowed out to form seats for the springs 70, and the inner ends of the springs rest against the rotor and around retaining pins 72 carried by the rotor.

Located between the stator chambers 29 and 30 is the fuel pump 73, and this fuel pump includes a reciprocating pump piston 74 operating in a pump cylinder 75. The piston 74 is provided with a piston stem 76 carrying an anti-friction roller 77. This roller 77 travels over a combined cam and starting gear wheel 78, and the inner surface of this wheel has formed thereon cam lobes or throws 79 at quarters thereon.

The starting cam and gear wheel 78 is keyed or otherwise secured to the propeller and power take-off shaft 23, and, consequently, during the turning of the rotor, the wheel 78 will be operated therewith, and the anti-friction roller 77 will travel about the cam track on said wheel and will be automatically moved in and out. A gear casing 80 can be secured to the stator for housing said wheel.

An expansion spring 81 is provided for normally moving the pump plunger outwardly and the anti-friction roller 77 against the inner face of the wheel 78. The pump cylinder 75 communicates with a fuel passageway 82. The inner end of this passageway communicates with a fuel atomizer 83, which can be of the type generally employed in Diesel engines for injecting atomized fuel in the engine cylinders.

The flow of fuel to the atomizer through the passageway 82 is controlled by a one-way ball check valve 84, which is normally held on its seat by a spring. Also communicating with the passageway 82 is a fuel inlet passageway 85, which receives fuel from any suitable source of supply. Fuel from the source of supply is controlled by a one-way opening ball check valve 86 arranged in the passageway 85, and this valve is normally held on its seat by a spring.

Also communicating with the passageway 82 is a bypass fuel passageway 87, and this passageway 87 communicates with the fuel inlet 85 beyond the check valve 86. A poppet or like valve 88 is employed for controlling the flow of fuel through the bypass, and this poppet valve can be automatically operated by a governor 89. This governor can be manually set and is driven from the power take-off shaft 23 in any suitable way, such as by a V-belt 90 trained about pulley wheels 91 and 92 secured, respectively, to the governor drive shaft and the power take-off shaft.

It might also be noted at this point that the V-belt 90 is also trained about a pulley wheel 93 keyed or otherwise secured to the armature 94 of a generator 95. This shaft 94 is also provided with a cooling fan 96. The generator 95 is utilized for various purposes, such as for developing power for the starting motor 97 of the engine. This starting motor 97 operates in the usual manner an engine starter 98, which functions in cooperation with the starter gear wheel 78 heretofore referred to.

The fuel pump 73 operates as follows. During the movement of the rotor and the wheel 78, the anti-friction roller 77 will follow the inner surface of the wheel 78, and when the roller rides on a cam throw or lobe 79, the pump piston 74 will be forced inwardly against the tension of its spring, and will compress any fuel in the pump cylinder and force this fuel through the passageway 82 and unseat the check valve 84 and deliver fuel charge under pressure to the fuel atomizer 83. At this time, the check valve 86 is held on its seat. When the anti-friction roller 77 rides off the cam lobe 79, the spring will force the pump plunger outwardly, and another fuel charge will be sucked into the pump cylinder and passageway 82 past the check valve 86.

By referring to Figure 1, it can be seen that the fuel atomizer 83 is located adjacent the fuel pump and extends into the stator and communicates with the extreme inner shallow end 33 of the firing chamber.

The fuel and air charge is admitted into the inner end of the firing chamber simultaneously, and the air under high pressure meeting the atomized fuel will cause the firing of the charge, and this charge will act against the vane in the firing chamber and cause the turning of the rotor. This operation takes place four times on each revolution of the rotor, and as the vane in the firing chamber moves toward the deep end 32 thereof, the burnt charge in advance of the vane will be forced out of the primary and secondary exhaust passageways 99 and 99'. These exhaust passageways can communicate with a suitable exhaust manifold. The primary exhaust port 99 is of a considerably greater diameter than the secondary exhaust port 99', and by arranging these ports in spaced relation, I insure the proper and complete scavenging of the firing chamber of the burnt gasses of each fired charge.

Means is provided for lubricating the various working parts of the engine, and it is to be noted that the lower part of the stator S is provided with an oil sump or tank 100 in which is mounted an oil pump 101. This pump takes in oil from the sump 100 and forces the same to an oil distributing manifold 102 mounted upon the top of the sump or tank 100. Various oil feed lines 103, 104, and 105 carry the oil to the various engine parts. The oil feed line 105 communicates with an annular oil distributing chamber 106 formed in the bearing disc extension 26 of the rotor R, and the rotor is bored to provide passageways 107 for carrying the oil from the annular chamber 106 to the chambers 38 defined by the walls of the cylinders and the liners 34. The oil under pressure flows into the cylinder liners through the ports 39, and, hence, the walls of the liners will be properly lubricated. The oil from the interior of the cylinder liners is carried through the passageways 45 and 44 out through the vanes to the inner surface of the stator for lubricating the same, and excess oil is drained from the stator back into the oil sump 100 through a drain opening 108 formed in the stator. This oil drain opening 108 communicates with the stator chamber 30. Obviously, the other oil feed lines, with their branches, lead to the various parts of the engine that need lubrication.

Means is also provided for cooling the engine around the combustion chamber 29 and the fuel injector, and, hence, the stator S is provided with a water jacket 109. This water jacket (see Figure 1) extends the length of the firing chamber 29 and around the fuel injector and the primary and secondary exhaust ports 99 and 99'.

For circulating the water, a water pump 110 is provided. This pump is mounted upon the upper end of the stator and is driven directly from the shaft of the generator 95. The water jacket has communicating therewith at spaced points the water inlet and outlet pipes, and these pipes communicate with the outlet and inlet of the pump.

It is also desired to provide means for sealing the rotor to prevent compression losses, and, hence, the opposite sides of the rotor R are engaged by annular compression or sealing rings 111. These rings are mounted in grooves formed in the inner walls of the stator S (see Figures 2, 8, and 9). The stator also carries a plurality of spaced compression or sealing strips 112, and these strips are seated in grooves in the inner surface of the outer stator wall at the opposite ends of the firing chamber 29. These strips 112 engage the periphery of the rotor. By referring to Figure 9, it can be seen that the inner ends of the strips 112 are seated in recesses 113 formed in the outer annular compression rings or packing strips 111.

Means is also provided for sealing the vanes 40 during their reciprocating movement, and this means includes the packing or sealing strips 46 carried by the walls of the guide slots 42 formed in the cylinder heads 41 carried by the rotor. These sealing strips 46 are of substantially a horseshoe shape when viewed in front elevation (see Figure 12), and the ends of these sealing strips are fitted in grooves 114 formed in short holding blocks 115.

The stator, at a desired point, can be provided with a removable sector 116. This sector is detachably held in position by holding screws 117. The provision of this sector is important, as inspection of the cylinders and the vanes can be had without the complete dismantling of the engine.

The oil pump 101 can be driven in any preferred manner from the power take-off shaft 23, and, for the purpose of illustration, I have shown a countershaft 118 arranged above the pump and the oil sump 100 and below the shaft 23. The shafts 23 and 118 are operatively connected together through the medium of a V-pulley belt 119, which is trained over pulleys 120 and 121 secured, respectively, to the shaft 23 and the shaft 118. The shaft 118 extends into a gear housing 122 mounted on top of the oil pump, and an intermediate drive mechanism connects the shaft 118 with the impeller shaft 123 of the pump.

During the rotation of the rotor, any air in the space 30 will be swept ahead of the vane 40 riding through said space, and this air can escape through the oil drain opening 108. After the vane 40 moves past the opening 108, any air remaining will be insufficient to affect the operation of the engine.

From the foregoing description it can be seen that I have provided an improved rotary internal combustion engine of the Diesel type in which the parts are compactly arranged and in which an adequate and simple means is provided for insuring the lubrication of the rotor and stator, the compression pistons, and their operating vanes.

Changes in details may be made without departing from the spirit or the scope of my invention, but what I claim as new is:

1. In a rotary Diesel internal combustion engine, a stator having a firing chamber therein and a chamber located in advance of the firing chamber, each of said chambers being provided with a cam face, a rotor snugly fitted in said stator provided with equidistantly spaced cylinders, removable cylinder liners fitted in said cylinders, removable cylinder heads carried by the rotor closing the cylinders and holding the liners in place, pistons reciprocally mounted in the cylinder liners, rigid vanes carried by the pistons slidable through the cylinder heads, means for supplying air from the exterior of the engine to the inner ends of the cylinders at certain times, means for controlling the flow of air from the cylinders to the combustion chamber, and spring means normally urging the vanes and pistons outwardly, the vanes and pistons being adapted to be cammed inwardly by the cam faces of the stator chambers.

2. In a rotary Diesel internal combustion engine, a stator having a firing chamber therein and a chamber located in advance of the firing chamber, each of said chambers being provided with a cam face, a rotor snugly fitted in said stator provided with equidistantly spaced cylinders, removable cylinder liners fitted in said cylinders, removable cylinder heads carried by the rotor closing the cylinders and holding the liners in place, pistons reciprocally mounted in the cylinder liners, rigid vanes carried by the pistons slidable through the cylinder heads, means for supplying air from the exterior of the engine to the inner ends of the cylinders at certain times, means for controlling the flow of air from the cylinders to the combustion chamber, spring means normally urging the vanes and pistons outwardly, the vanes and pistons being adapted to be cammed inwardly by the cam faces of the stator chambers, and means for lubricating the inner walls of the cylinder liners.

3. In a rotary internal combustion engine, a stator having a firing chamber therein and a chamber located in advance of the firing chamber, each of the chambers being provided with a cam face, a rotor snugly fitted in the stator having equidistantly spaced cylinder chambers therein, cylinder liners removably fitted in the cylinder chambers and spaced from the outer walls of said cylinder chambers to define in connection therewith oil-receiving spaces, means for supplying oil under pressure to said spaces, removable cylinder heads secured to the rotor closing the cylinder chambers and holding the cylinder liners in place, air compressing pistons slidably mounted in the cylinder liners, means for supplying air from the atmosphere to the cylinder chambers inward of said pistons, rigid vanes carried by the pistons slidable through the heads, spring means normally urging the pistons and vanes outward, the pistons and vanes being adapted to be cammed in by the engagement of the outer ends of the vanes with the cam faces of the stator chambers, means for controlling the flow of air under pressure from the cylinder chambers to the exterior of the rotor, the cylinder liners having oil ports therein communicating with said oil spaces and the interior of the cylinder liners outwardly of the pistons, and means for lubricating the stator from the liners including oil passageways in the vanes communicating with the interior of the cylinder liners, said passageways opening out through the outer ends of said vanes.

4. In a rotary internal combustion engine, a stator having a firing chamber therein and a chamber located in advance of the firing chamber, each of the chambers being provided with a cam face, a rotor snugly fitted in the stator having equidistantly spaced cylinder chambers therein, cylinder liners removably fitted in the cylinder chambers and spaced from the outer walls of said cylinder chambers to define in connection therewith oil-receiving spaces, means for supplying oil under pressure to said spaces, removable cylinder heads secured to the rotor closing the cylinder chambers and holding the cylinder liners in place, air compressing pistons slidably mounted in the cylinder liners, means for supplying air from the atmosphere to the cylinder chambers inward of said pistons, rigid vanes carried by the pistons slidable through the heads, spring means normally urging the pistons and vanes outward, the pistons and vanes being adapted to be cammed in by the engagement of the outer ends of the vanes with the cam faces of the stator chambers, means for controlling the flow of air under pressure from the cylinder chambers to the exterior of the rotor, the cylinder liners having oil ports therein communicating with said oil spaces and the interior of the cylinder liners outwardly of the pistons, means for lubricating the stator from the liners including oil passageways in the vanes communicating with the interior of the cylinder liners, said passageways opening out through the outer ends of said vanes, said means for supplying oil under pressure to the oil spaces including an oil pump, an annular oil passageway in the rotor, means for supplying oil from the pump to said annular passageway, and passageways formed in the rotor connecting the annular passageway with the oil spaces surrounding the cylinder liners.

5. In a rotary Diesel internal combustion engine, a stator having a firing chamber therein, and a chamber located in advance of the firing chamber, each of said chambers being provided with a cam face, a rotor snugly fitted in said stator, sliding vanes carried by the rotor movable into the chambers and adapted to be cammed into the rotor by the cam faces, spring means normally urging the vanes outward into the chambers, means operated by the vanes for compressing air in the rotor, means for controlling the flow of compressed air into the firing chamber, a fuel injector carried by the stator communicating with the firing chamber, a fuel pump operated from the rotor for supplying fuel under pressure to the injector, means for supplying fuel to the pump, a by-pass passage in the stator for the pump, and a governor driven from said rotor for controlling the by-pass passage.

6. In a rotary Diesel internal combustion engine, a stator having a firing chamber therein, and a chamber located in advance of the firing chamber, each of said chambers being provided with a cam face, a rotor snugly fitted in said stator, sliding vanes carried by the rotor movable into the chambers and adapted to be cammed into the rotor by the cam faces, spring means normally urging the vanes outward into the chambers, means operated by the vanes for compressing air in the rotor, means for controlling the flow of compressed air into the firing chamber, a fuel injector carried by the stator communicating with the firing chamber, a fuel pump operated from the rotor for supplying fuel under pressure to the injector, means for supplying fuel to the pump, a by-pass passage in the stator for the pump, a governor driven from said rotor for controlling the by-pass passage, and sealing strips carried by the stator engaging the periphery of the rotor on opposite sides of the firing chamber.

7. In a rotary Diesel internal combustion engine, a stator having a firing chamber therein, and a chamber located in advance of the firing chamber, each of said chambers being provided with a cam face, a rotor snugly fitted in said stator, sliding vanes carried by the rotor movable into the chambers and adapted to be cammed into the rotor by the cam faces, spring means normally urging the vanes outward into the chambers, means operated by the vanes for compressing air in the rotor, means for controlling the flow of compressed air into the firing chamber, a fuel injector carried by the stator communicating with the firing chamber, a fuel pump operated from the rotor for supplying fuel under pressure to the injector, means for supplying fuel to the pump, a by-pass passage in the stator for the pump, a governor driven from said rotor for controlling the by-pass passage, sealing strips carried by the stator engaging the periphery of the rotor on opposite sides of the firing chamber, and a set of sealing rings carried by the sides of the stator engaging the opposite sides of the rotor, the sealing strips engaging certain of the sealing rings.

8. In a rotary Diesel internal combustion engine, a stator having a firing chamber therein, and a chamber located in advance of the firing chamber, each of said chambers being provided with a cam face, a rotor snugly fitted in said stator, sliding vanes carried by the rotor movable into the chambers and adapted to be cammed into the rotor by the cam faces, spring means normally urging the vanes outward into the chambers, means operated by the vanes for compressing air in the rotor, means for controlling the flow of compressed air into the firing chamber, a fuel injector carried by the stator communicating with the firing chamber, a fuel pump operated from the rotor for supplying fuel under pressure to the injector, means for supplying fuel to the pump, a by-pass passage in the stator for the pump, a governor driven from said rotor for controlling the by-pass passage, sealing strips carried by the stator engaging the periphery of the rotor on opposite sides of the firing chamber, a set of sealing rings carried by the sides of the stator engaging the opposite sides of the rotor, the sealing strips engaging certain of the sealing rings, and sealing strips carried by the rotor engaging the opposite faces of the vanes.

GEORGE F. PIEPER.